PLAY-RECORD CONTROL MECHANISM FOR TAPE RECORDERS

Filed Oct. 29, 1964

2 Sheets-Sheet 1

Inventors
Alfred C. Ratter and
Marion R. Karecki
By Brown, Jackson,
Boettcher and Dienner Att'ys Inventors
Alfred C. Ratter and
Marion R. Karecki
By Brown, Jackson,
Boettcher & Dienner Att'ys 3,319,483

PLAY-RECORD CONTROL MECHANISM FOR TAPE RECORDERS

Alfred C. Ratter and Marion R. Karecki, St. Joseph, Mich., assignors to V-M Corporation, Benton Harbor, Mich., a corporation of Michigan Filed Oct. 29, 1964, Ser. No. 407,398
10 Claims. (Cl. 74—483)

The present invention relates to a tape recorder, and particularly to control mechanism for selectively conditioning the tape recorder for record or for playback as desired. More specifically, the invention relates to mechanism including a pair of independent control members both of which must be manually actuated in proper sequence in order to condition the tape recorder for recording, thereby preventing accidental recording and the consequent accidental erasure of previously recorded information.

The tape recorder of the present invention has a plurality of push button controls which are selectively actuated manually in order to control the operation of the recorder. Thus, there are provided a rewind button, a fast forward button, a stop button, and a play-record button. Since the same push button controls both playback of information on the tape and recording of new information thereon, it is of course necessary to provide additional selection control mechanism to determine whether the recorder is conditioned for play or for record when the play-record button is actuated. It should also be understood that when the tape recorder is set for record, the previously recorded information will be erased, and thus it is desirable to provide control mechanism which minimizes the possibility of accidental recording. In the tape recorder of the present invention the recorder is normally conditioned for play when the play-record button is depressed, and in order to condition the device for record a separate record control must be depressed and held while the play-record button is depressed.

Therefore, it is an object of the present invention to provide a tape recorder having improved selection control mechanism for conditioning the tape recorder for recording.

A further object is to provide a tape recorder as last above-mentioned wherein the selection control mechanism includes a pair of manual control members which must both be actuated in proper sequence in order to condition the device for recording.

The foregoing and other objects and advantages of the invention will be apparent from the following description thereof.

Now in order to acquaint those skilled in the art with the manner of practicing and utilizing our invention, we shall describe in conjunction with the accompanying drawings a preferred embodiment of the invention.

Figure 1:
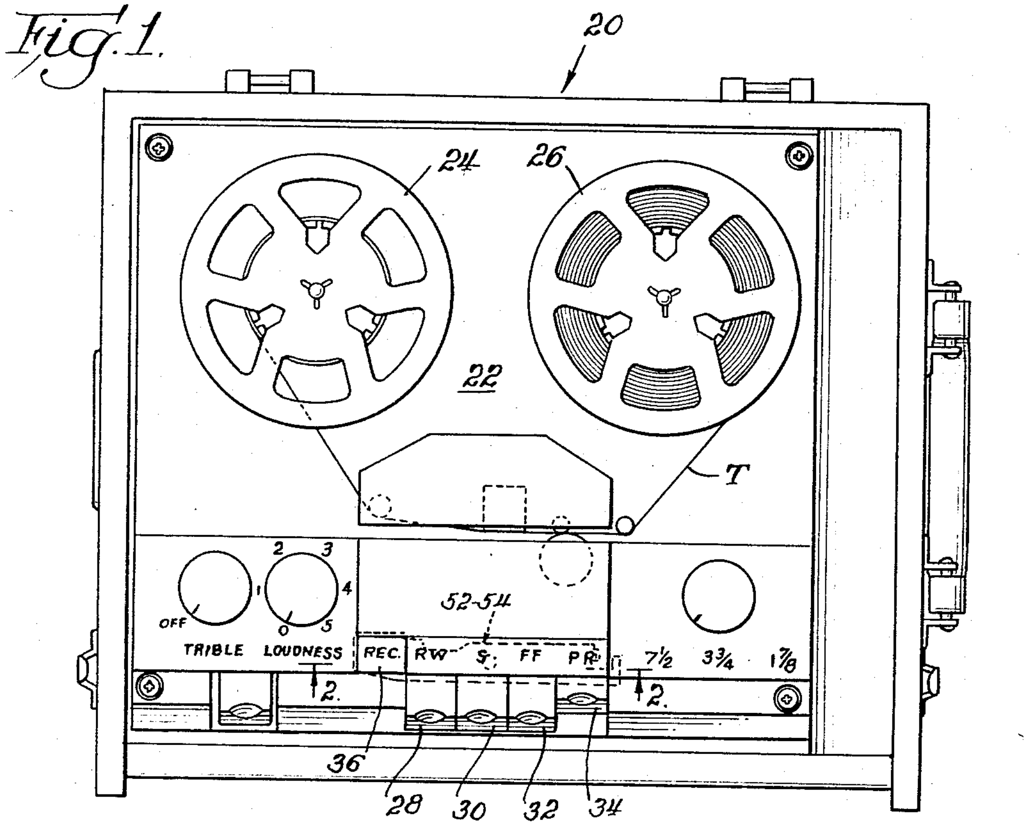
FIGURE 1 is a top plan view of a tape recorder embodying the selection control mechanism of the present invention.

Referring now to the drawings, FIGURE 1 shows a tape recorder 20 having a baseplate 22, left and right hand tape reels 24 and 26 on which a length of tape T is wound, and four push buttons comprising a rewind button 28, a stop button 30, a fast forward button 32 and a play-record button 34. There is also shown a separate record button 36. As will be explained more fully hereinafter, the buttons 28, 30, 32 and 34 are mounted on the ends of slide levers and are moved rearwardly in a horizontal plane in order to actuate them, the play-record button 34 being shown in actuated position in FIGURE 1, whereas the record button 36 is manually pressed downwardly in order to actuate the same.

Figure 2:
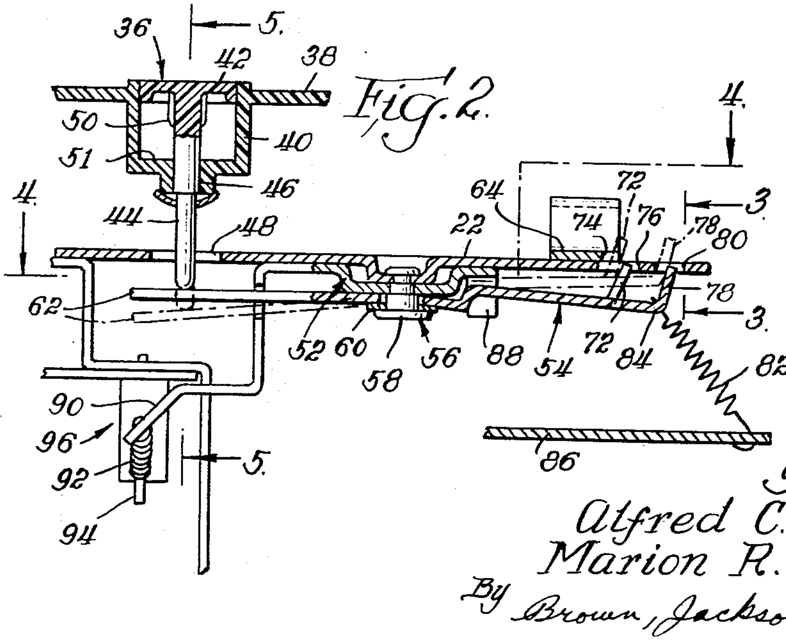
FIGURE 2 is an enlarged fragmentary vertical section, taken substantially along the line 2—2 of FIGURE 1, showing a play-record slide and a separate record button together with interlock mechanism therebetween.

FIGURE 2 shows a cover plate housing 38 having a well 40 in which the record button 36 is disposed. The record button 36 comprises an enlarged upper end 42 which is vertically slidable in the well 40, and the button has a downwardly projecting rod 44 which is integral therewith and extends downwardly through an opening 46 at the base of the well 40 and through an opening 48 in the baseplate 22. A shoulder 50 is formed at the upper end of the rod 44 for engagement with the base 51 of the well 40 in order to limit the downward movement of the record button 36. As will be explained more fully hereinafter, actuation of the play-record button 34 will condition the tape recorder for play, and in order to condition the device for record it is necessary to first depress and hold the record button 36, and thereafter to actuate the play-record button 34.

FIGURE 2 further shows a switch lever 52 and a record interlock lever 54, both of which are mounted beneath the baseplate 22 on a shoulder rivet 56. The switch lever 52 is mounted substantially immediately beneath the baseplate 22 and is pivotable about the vertical axis of the shoulder rivet 56 between a normal position and an actuated position. The record interlock lever 54 is mounted on the shoulder rivet 56 beneath the switch lever 52 and is supported by an enlarged head 58 formed at the lower end of the rivet. In addition, however, a spring washer 60 is preferably disposed between the bottom of the lever 54 and the rivet head 58. The interlock lever 54 is tiltable about a generally horizontal axis between a normal position as shown in solid lines in FIGURE 2 and an operative position as shown in dash lines therein, and it will be seen that the lower end of the rod 44 on the record button 36 engages an end portion 62 on the interlock lever 54, whereby when the record button 36 is moved downwardly the lever 54 is rocked to its operative dash line position. Sufficient space must be provided between the underside of the switch lever 52 and the enlarged rivet head 58 to permit such tilting or rocking of the interlock lever 54 about a horizontal axis, but the latter is normally maintained in close engagement with the switch lever 52 by the spring washer 60. It should be understood that the record interlock lever 54 is pivotable about the vertical axis of the rivet 56, in addition to being tiltable as described above.

Figures 4, 5:
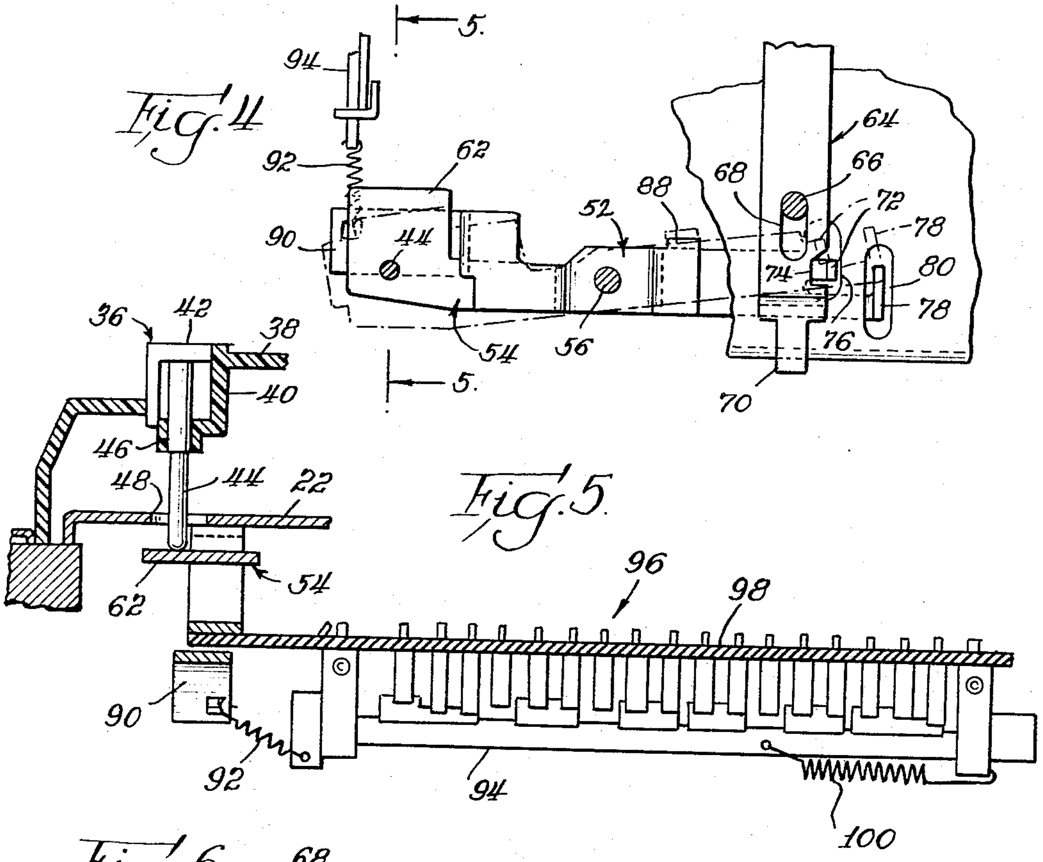
FIGURE 4 is a fragmentary horizontal section taken substantially along the line 4—4 of FIGURE 2.
FIGURE 5 is a fragmentary vertical section, taken substantially along the line 5—5 of FIGURE 2 showing a slide switch which when actuated conditions the tape recorder for recording, and further showing a record button and related mechanism for effecting actuation of the switch.
Figure 6:
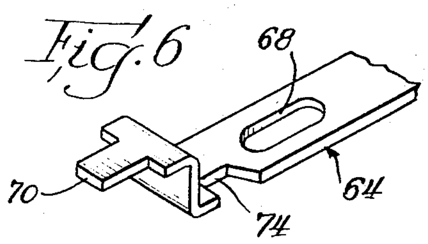
FIGURE 6 is a fragmentary perspective view of a play-record slide.

FIGURES 2, 4 and 6 show a play-record slide 64 which is slidable forwardly and rearwardly on the top of the baseplate 22, such movement being limited by a pin 66 (see FIGURE 4) which projects through a slot 68 in the slide. While the play-record slide 64 is illustrated without a button knob thereon, it will be understood that the button 34 shown in FIGURE 1 is mounted on an end tab 70 formed at the forward end of the slide so as to permit the slide to be manually pushed to its rearward operative position. In addition, conventional latch means and lockout means may be provided so that only one of the buttons 28, 30 32 and 34 can be pushed to operative position at any given time, and when one of the buttons is pushed to operative position it will automatically be latched in such position until another button is depressed thereby releasing the first button. Such latch means and lockout means are well known in the art and are not described herein. For purposes of understanding the present invention it need simply be noted that when the play-record button 34 of FIGURE 1 is pressed rearwardly, the play-record slide 64 will be moved rearwardly and will be latched in such rearward operative position while play or record is taking place, and when the stop button 30 is subsequently depressed, the play-record slide 64 will be released and will be returned by spring means (not shown) to its normal forward or inoperative position.

Figures 7, 8:
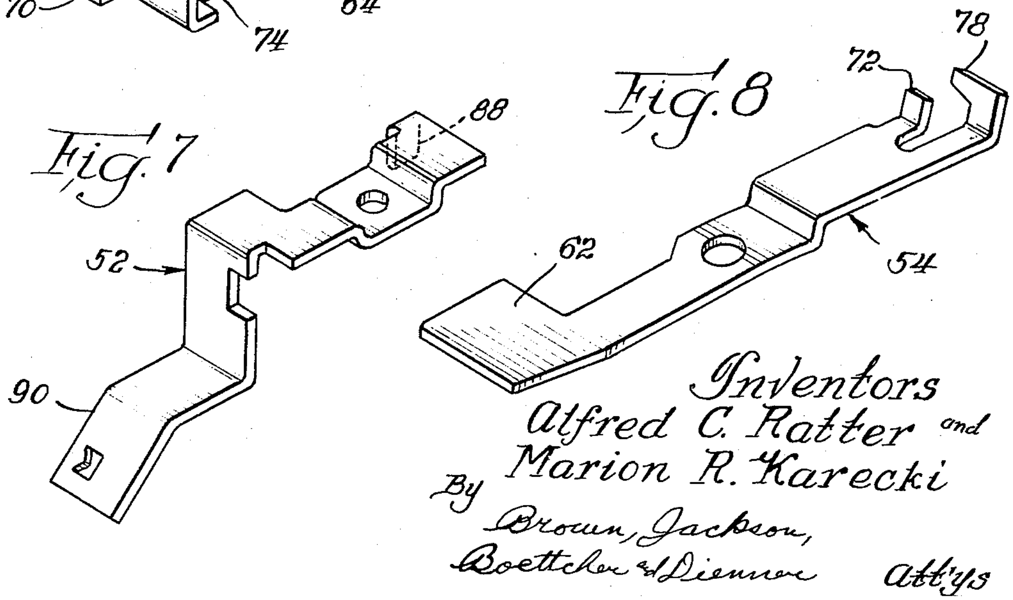
FIGURE 7 is a fragmentary perspective view of a switch lever which is connected with the slide switch of FIGURE 5 for actuating the latter.
FIGURE 8 is a perspective view of a record interlock lever which when actuated in effect interlocks the switch lever of FIGURE 7 with the play-record slide of FIGURE 6.

The record interlock lever 54 has an upright tab 72 (see FIGURE 8) which cooperates with a notch 74 (see FIGURE 6) formed in the play-record slide 64. When the tiltable interlock lever 54 is in its normal position as shown in solid lines in FIGURE 2, the tab 72 projects partially into an opening 76 in the baseplate 22, but it does not extend above the baseplate. However, when the interlock lever 54 is tilted to the dash line position, the tab 72 projects above the baseplate up through the notch 74 in the play-record slide 64, whereby if the play-record slide is actuated rearwardly while the lever 54 is in such position, the lever 54 will be carried with the slide 64 and will thus be rotated in a counterclockwise direction (viewed from above) about the axis of the shoulder rivet 56 from the position shown in solid lines in FIGURE 4 to the position shown in dash lines therein.

Figure 3:
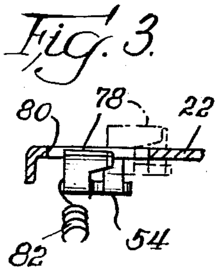
FIGURE 3 is a fragmentary vertical section, taken substantially along the line 3—3 of FIGURE 2, showing one end of a record interlock lever, the lever being shown in solid lines in its normal position and in dash lines in its actuated position.

A second upright tab 78 on the lever 54 projects up through an opening 80 in the baseplate 22 (see FIGURES 2, 3, 4 and 8) when the lever 54 is tilted to the dash line position of FIGURE 2, and when the lever is thereafter rotated in a counterclockwise direction to the dash line pisition of FIGURE 4, the tab 78 projects over an edge of the baseplate 22 as best shown in FIGURE 3 to prevent the interlock lever 54 from tilting back to the solid line position of FIGURE 2 until such time as the play-record slide 64 is unlatched and returned to its forward inoperative position. FIGURE 2 shows a tension spring 82 having one end 84 connected to the record interlock lever 54 and its other end anchored to a fixed plate 86, whereby the spring 82 biases the lever 54 to the solid line position of FIGURE 2.

When the record interlock lever 54 is pivoted in a counterclockwise direction to the dash line position of FIGURE 4, it carries with it the switch lever 52 which this is similarly pivoted in a counterclockwise direction. There is a downwardly projecting tab 88 formed on the switch lever 52 (see FIGURES 2, 4 and 7) and such tab extends immediately rearwardly of the edge of the interlock lever 54, whereby when the lever 54 pivots in a counterclockwise direction it engages the tab 88 and also pivots the switch lever 52. When the switch lever 52 is thus pivoted to the dash line position of FIGURE 4, and end 90 thereof moves forwardly so as to pull a tension spring link 92 and thereby pull a slide 94 to a forward position, the slide 94 being a component of a slide switch 96. The slide switch 96 is best shown in FIGURE 5 and comprises the movable slide component 94 and a fixed component 98. As viewed in FIGURE 5, the slide 94 is biased to its right hand or normal position by a tension spring 100, and when the switch is in such normal position the tape recorder 20 will be conditioned for play when the play-record button 34 is depressed. When the slide 94 is pulled to its left hand position through pivotal movement of the switch lever 52 as described above, the switch 96 is actuated so that when the play-record button 34 is depressed the tape recorder 20 will be conditioned for record.

In operation, the record interlock lever 54 is normally held in the solid line position of FIGURE 2 by the tension spring 82, and thus when the play-record button 34 is actuated the play-record slide 64 will be moved rearwardly and temporarily latched in its rearward position, but the lever 54 will not be actuated nor will the switch 96. Accordingly, the tape recorder 20 will be conditioned for playing. When it is desired to record, the record button 36 is first depressed downwardly and held, and the lower end of the rod 44 will thus depress the end 62 of the record interlock lever 54 and tilt the latter to the dash line position of FIGURE 2 causing the upright tab 72 on the lever 54 to project into the notch 74 formed in the play-record slide 64. With the record button 36 manually held downwardly, the play-record button 34 is actuated rearwardly causing the play-record slide 64 to be moved rearwardly, the slide 64 being automatically latched in its actuated rearward position by latching means (not shown).

When the play record slide 64 is moved rearwardly, it engages the tab 72 on the record interlock lever 54 and pivots the latter counterclockwise (viewed from above) about the rivet 56 to the dash line position of FIGURE 4, and because the lever 54 engages a downwardly projecting tab 88 on the switch lever 52, the lever 52 is also pivoted in a counterclockwise direction about the rivet 56 to the dash line position of FIGURE 4. When the switch lever 52 is thus pivoted, the end 90 thereof pulls on the spring 92 so as to pull the switch slide 94 forwardly against the force of the spring 100. The switch slide 94 is thus moved forwardly to actuate the switch 96 and condition the tape recorder 20 for record. Once the play-record button 34 is actuated so as to actuate the play-record slide 64, the latter will be latched in operative position and the record button 36 can be released. Since the record interlock lever 54 will be in its counterclockwise position, the tab 78 thereon will overlie a portion of the baseplate 22 as shown in dash lines in FIGURE 3, and thus the lever 54 will be maintained in the dash line position of FIGURE 2 with the tab 72 projecting into the notch 74 in the play-record slide 64. Actuation of the stop button 30 will return all parts to their original positions.

Because the tape recorder 20 can be conditioned for record only by first depressing the record button 36 and holding it down while the play-record button 34 is being actuated, the possibility of accidental recording and the consequent accidental erasure of previously recorded information is minimized. In addition, record control mechanism is completely independent of any electrical components except for the connection with the slide 94 of switch 96, thus assuring simplicity in the servicing of the amplifier.

While we have described our invention in a preferred form, we do not intend to be limited to such form, except insofar as the appended claims are so limited, since modifications within the scope of the present invention will readily occur to others, particularly with our disclosure before them.

We claim:

1. In a tape recorder, manually operable control mechanism for conditioning the tape recorder for recording, said control mechanism comprising, in combination manually operable play-record actuating means movable between a normally inoperative position and an actuated play-record position, a switch having a normal play position and an actuated record position, switch-actuating means for moving said switch to said actuated record position, and manually operable interlock means movable between an inoperative position and an operative position for interlocking said switch-actuating means with said play-record actuating means whereby when said interlock means is first manually actuated to its operative position and said play-record means is thereafter manually actuated, said switch will be moved to said actuated record position thereby conditioning said tape recorder for recording.

2. In a tape recorder, manually operable control mechanism for conditioning the tape recorder for recording, said control mechanism comprising, in combination, a manually operable play-record slide movable between a normally inoperative position and an actuated play-record position, a switch having a normal play position and an actuated record position, switch-actuating means for moving said switch to said actuated record position, and manually operable interlock means movable between an inoperative position and an operative position for interlocking said switch-actuating means with said play-record slide whereby when said interlock means is first manually actuated to its operative position and said play-record slide is thereafter manually actuated, said switch will be moved to said actuated record position thereby conditioning said tape recorder for recording.

3. In a tape recorder, manually operable control mechanism for conditioning the tape recorder for recording, said control mechanism comprising, in combination, a manually operable play-record slide movable between a normally inoperative position and an actuated play-record position, a switch having a normal play position and an actuated record position, switch-actuating means for moving said switch to said actuated record position, interlock means for interlocking said switch-actuating means with said play-record slide, said interlock means being movable between an inoperative position and an operative position, and a manually operable record control member for actuating said interlock means to its operative position whereby when said record control member is first manually actuated and said play-record slide is thereafter manually actuated, said switch will be moved to said actuated record position thereby conditioning said tape recorder for recording.

4. In a tape recorder, manually operable control mechanism for conditioning the tape recorder for recording, said control mechanism comprising, in combination, a manually operable play-record slide movable rectilinearly between a normally inoperative position and an actuated play-record position, a switch having a normal play position and an actuated record position, a pivotally mounted switch-actuating lever having one end associated with said switch for moving the latter to said actuated record position, interlock means for interlocking said switch-acting lever with said play-record slide whereby rectilinear movement of said play-record slide will produce pivotal movement of said switch-actuating lever, said interlock means being movable between an inoperative position and an operative position, and a manually operable record control member for actuating said interlock means to its operative position whereby when said record control member is first manually actuated and said play-record slide is thereafter manually actuated, said switch will be moved to said actuated record position thereby conditioning said tape recorder for recording.

5. In a tape recorder, manually operable control mechanism for conditioning the tape recorder for recording, said control mechanism comprising, in combination, a manually operable play-record slide movable rectilinearly between a normally inoperative position and an actuated play-record position, a switch having a normal play position and an actuated record position, a pivotally mounted switch-actuating lever having one end associated with said switch for moving the latter to said actuated record position, interlock means for interlocking said switch-actuating lever with said play-record slide whereby rectilinear movement of said play-record slide will produce pivotal movement of said switch-actuating lever, said interlock means being movable between an inoperative position and an operative position, spring means for biasing said interlock means toward its inoperative position, and a manually operable record control member for moving said interlock means to its operative position whereby when said record control member is first manually actuated and said play-record slide is thereafter actuated, said switch will be moved to said actuated record position thereby conditioning said tape recorder for recording.

6. In a tape recorder, manually operable control mechanism for conditioning the tape recorder for recording, said control mechanism comprising, in combination, a manually operable play-record slide movable rectilinearly between a normally inoperative position and an actuated play-record position, a switch having a normal play position and an actuated record position, a pivotally mounted switch-actuating lever having one end associated with said switch for moving the latter to said actuated record position, and a pivotally mounted interlock level engageable with said switch-actuating lever for moving the latter in conjoint rotation therewith about a common axis, said interlock lever also being movable between an inoperative position wherein it is independent of said play-record slide and an operative position wherein it engages with said play-record slide for actuation by the latter whereby when said interlock lever is first moved to its operative position and said play-record slide is thereafter manually actuated, said switch will be moved to said actuated record position thereby conditioning said tape recorder for recording.

7. In a tape recorder, manually operable control mechanism for conditioning the tape recorder for recording, said control mechanism comprising, in combination, a a manually operable play-record slide movable rectilinearly between a normally inoperative position and an actuated play-record position, a switch having a normal play position and an actuated record position, a pivotally mounted switch-actuating lever having one end associated with said switch for moving the latter to said actuated record position, a pivotally mounted interlock lever engageable with said switch-actuating lever for moving the latter in conjoint rotation therewith about a common axis, said interlock lever also being movable between an inoperative position wherein it is independent of said play-record slide and an operative position wherein it engages with said play-record slide for actuation by the latter whereby rectilinear movement of said play-record slide will produce pivotal movement of said interlock lever, spring means for biasing said interlock lever toward its inoperative position, and a manually operable record control member for actuating said interlock lever to its operative position whereby when said record control member is first manually actuated and said play-record slide is thereafter manually actuated, said switch will be moved to said actuated record position thereby conditioning said tape recorder for recording.

8. In a tape recorder, manually operable control mechanism for conditioning the tape recorder for recording, said control mechanism comprising, in combination, a manually operable play-record slide movable recilinearly between a normally inoperative position and an actuated play-record position, a switch having a normal play position and an actuated record position, a pivotally mounted switch-actuating lever having one end associated with said switch for moving the latter to said actuated record position, a pivotally mounted interlock lever engageable with said switch-actuating lever for moving the latter in conjoint rotation therewith about a common axis, said interlock lever also being movable between an inoperative position wherein it is independent of said play-record slide and an operative position wherein its engages with said play-record slide for actuation by the latter whereby rectilinear movement of said play-record slide will produce pivotal movement of said interlock lever, spring means for biasing said interlock lever toward its inoperative position, and a manually operable record control button movable rectilinearly in a direction approximately parallel to said common axis and engageable with said interlock lever for moving the latter to its operative position whereby when said record control button is first manually actuated and said play-record slide is thereafter manually actuated, said switch will be moved to said actuated record position thereby conditioning said tape recorder for recording.

9. In a tape recorder, manually operable control mechanism for conditioning the tape recorder for recording, said control mechanism comprising, in combination, a baseplate, a manually operable play-record slide movable rectilinearly in a plane parallel to said baseplate between a normally inoperative position and an actuated play-record position, a switch having a normal play position and an actuated record position, a switch-actuator lever carried by said baseplate for pivotal movement about a first axis approximately perpendicular to said baseplate and having one end associated with said switch for moving the latter to said actuated record position, an interlock lever carried by said baseplate for pivotal movement about said first axis and engageable with said switch-actuating lever for moving the latter in conjoint rotation therewith about said first axis, said interlock lever also being tiltable about a second axis approximately parallel to the plane of said baseplate between an inoperative position wherein it is independent of said play-record slide and an operative position wherein it engages with said play-record slide for actuation by the latter whereby rectilinear movement of said play-record slide will produce pivotal movement of said interlock lever about said first axis, spring means for biasing said interlock lever about said second axis toward its inoperative position, and a manually operable record control buton movable rectilinearly in a direction approximately perpendicular to said baseplate and engageable with said interlock lever for tilting the latter about said second axis to its operative position whereby when said record control button is first manually actuated and said play-record slide is thereafter manually actuated, said switch will be moved to said actuated record position thereby conditioning said tape recorder for recording.

10. The invention of claim 9 wherein said switch-actuating lever and said interlock lever are both mounted on a common pivot member carried by said baseplate, and wherein spring washer means is mounted on said pivot member to stabilize said interlock member while permitting the latter to tilt about said second axis.

No references cited.

MILTON KAUFMAN, *Primary Examiner.*